Aug. 27, 1935.  C. T. WALTER  2,012,489
SLICING MACHINE
Filed Oct. 10, 1932    5 Sheets-Sheet 2
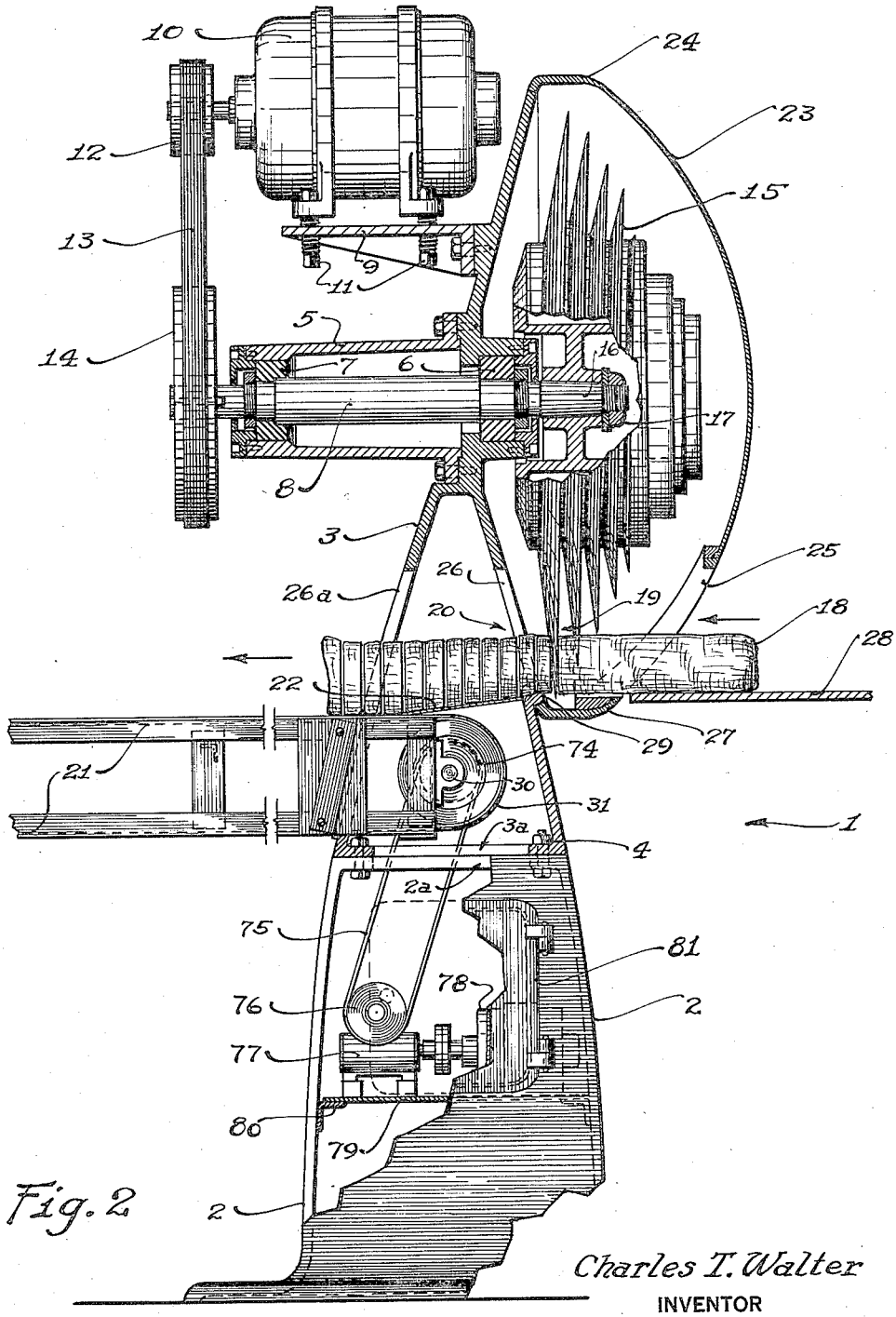
Fig. 2
WITNESS
Wm C. Meiser
Charles T. Walter
INVENTOR
BY 
ATTORNEY

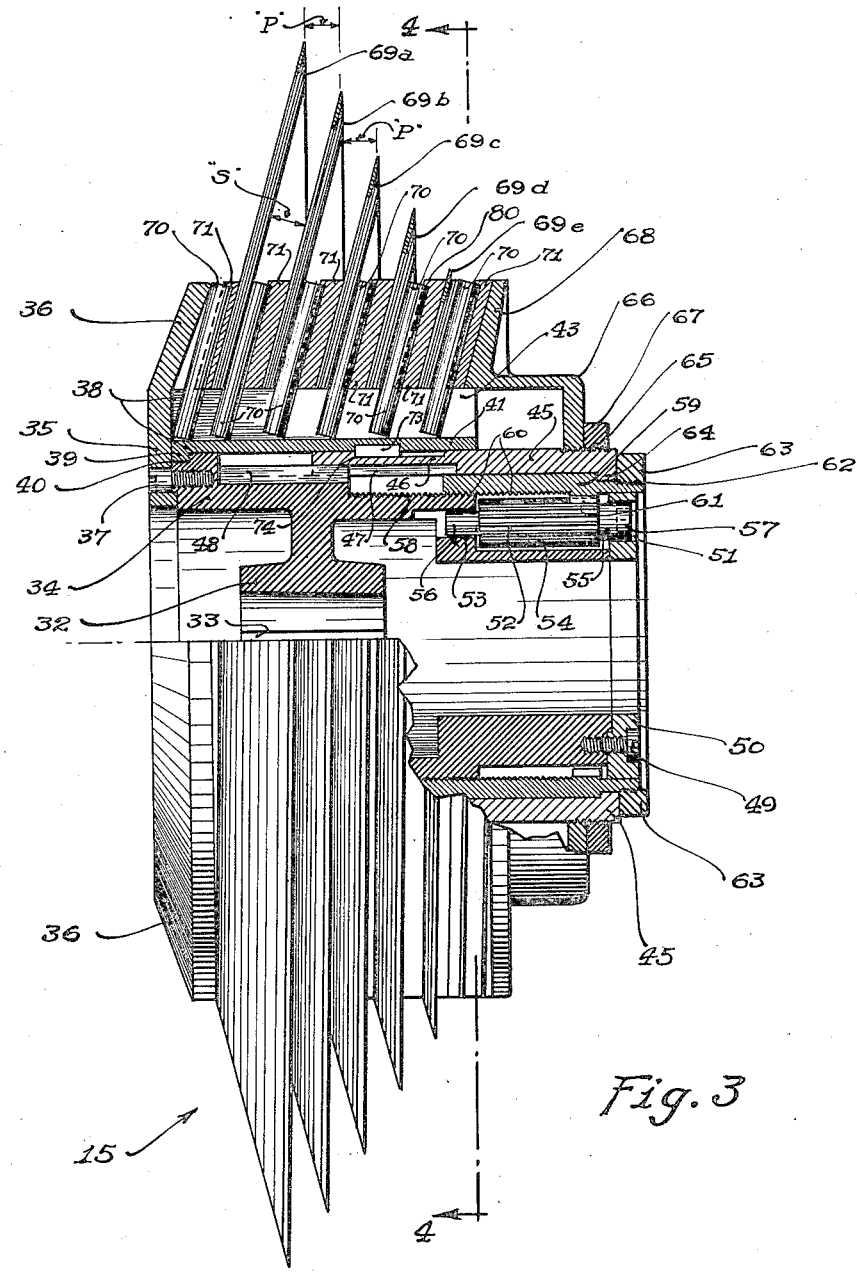

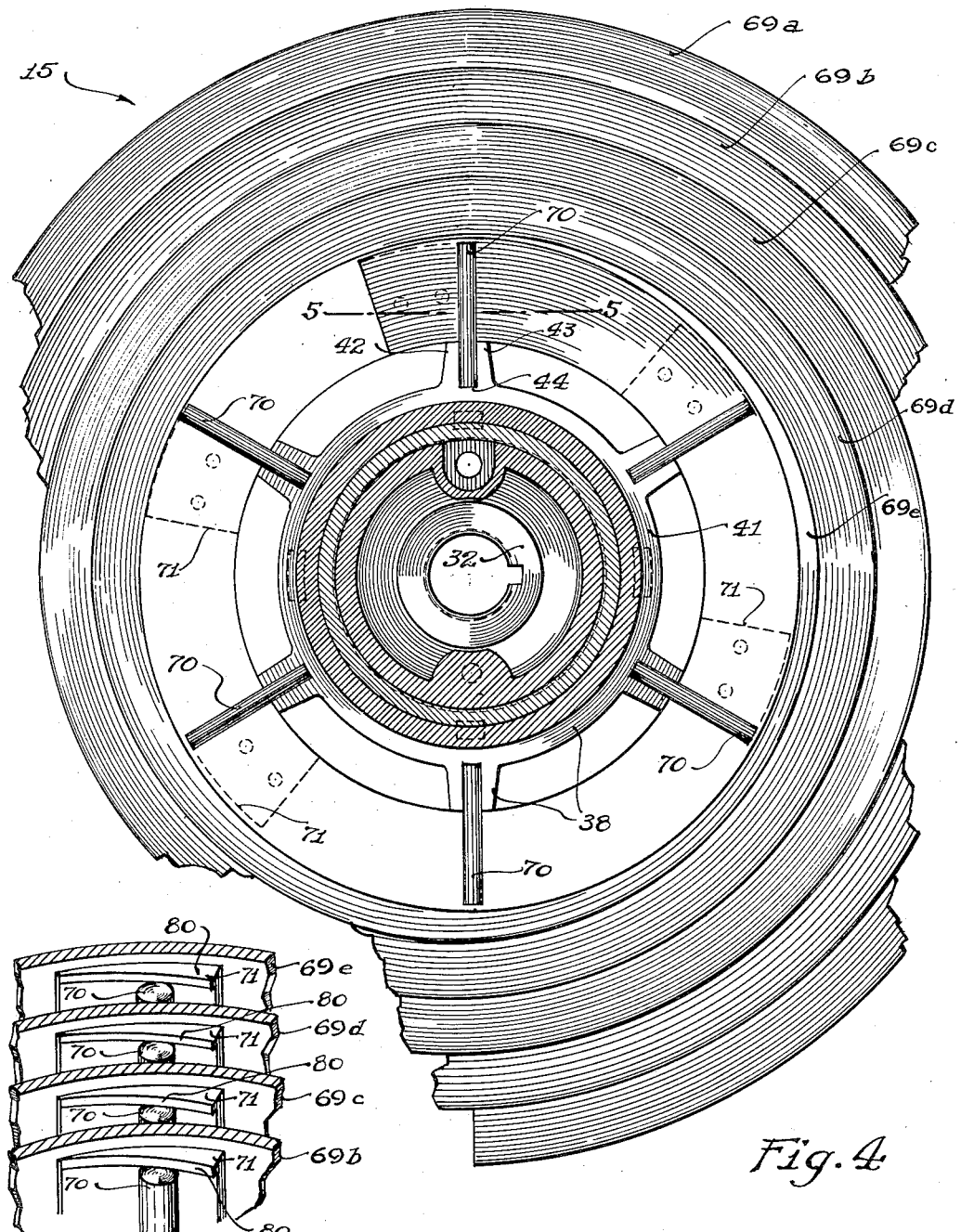

Aug. 27, 1935.   C. T. WALTER   2,012,489
SLICING MACHINE
Filed Oct. 10, 1932   5 Sheets-Sheet 5

Charles T. Walter
INVENTOR

Patented Aug. 27, 1935

2,012,489

UNITED STATES PATENT OFFICE 2,012,489

SLICING MACHINE

Charles T. Walter, Chicago, Ill., assignor to Industrial Patents Corporation, Chicago, Ill., a corporation of Delaware Application October 10, 1932, Serial No. 637,053

28 Claims. (Cl. 146—95)

This invention relates to meat slicing or cutting machines and to rotary cutter constructions therefor. The present invention involves and contemplates an embodiment of and an employment of an invention and particularly certain aspects thereof which is the subject of my application Serial No. 474,905, filed August 13, 1930, for Slicing machines and which has eventuated into Patent No. 1,909,029 dated May 16, 1933.

In my said prior patent there is shown a meat cutting or slicing machine having a rotary cutter that has a knife or cutter constructed so as to provide a cutting edge in the form of a conical spiral or conical helix with the small end rearmost, in which the body of the blades of the cutter is sloped or inclined in an outward and rearward direction. In other words the inclination of the body of the blades is outwardly and towards the small end of the conical convolution or conical helix that defines the general contour of the cutting edge.

Also in the cutter of my said prior patent the rear outer or peripheral portion of each blade is shown as bevelled whereby there is enabled to be realized the desired cutting edge along the blade sections.

By means of the cutter of my prior patent, one is enabled to cut into successive slices, meat products fed to the cutter and supported in respect thereto while drawn forwardly by the cutter during the functioning thereof.

The inclined or sloping arrangement of the body of the cutting blades results in a cutter construction in which the sliced or cut meat products can readily clear the cutter and thus avoid any packing or jamming of the meat products in the spaces between the blade elements because the shortest distance between adjacent blade convolutions is greater than is the cutting pitch or slice thickness of the cutter.

This characteristic is an important feature of the invention of said prior patent and permeates the cutter construction of the present invention.

The present invention is based upon further improvements which I have developed and found practicable or advisable to employ, include and/or comprehend in the more highly developed machine construction as it has been designed for commercial operation in slicing machines of large capacity to which the invention of said prior patent is found to be particularly adaptable.

One object of the present invention is to arrange the machine parts so that the material to be sliced or cut can be fed to a cutting section of the machine one piece after the other without requiring skilled attention on the part of the operator. Another object of the invention is to construct the machine so that the material to be sliced is properly fed or conducted to the rotary cutter of the machine; is properly supported during the cutting operation; and is delivered from the cutting section of the machine to that place from which, or to conveying mechanism by which, the sliced material is taken away or is conveyed from the machine in a suitable manner.

Another object of the invention is to provide a slicing machine with protective devices arranged in respect to the moving elements of the machine in such a manner that workmen are at all times reasonably protected when the machine is in operation. To that end the conical spiral shaped or conical helical cutting element, the cutting capacity of which is enormous, is particularly protected by a covering casing. The material to be sliced must pass through a suitable ingress opening in this covering casing in order to come under the cutting influence of the revolving cutter of the machine.

Another object of the invention is to arrange the several parts of the machine so that there is provided a compact construction in which all parts are readily accessible for inspection, replacement or repair but so that there is a relatively small amount of floor space occupied by the machine.

Another object or aspect of the invention relates to the construction of the cutting elements of or for use in the machine and also to the arrangement of parts entering into the construction of the cutting element whereby the cutting blade element thereof can be changed, adjusted, readjusted and/or assembled according to the particular requirements as and when desired.

Reference will now be made to the drawings forming a part of this specification and in which drawings; Figure 1 is an end elevation of a slicing machine or in other words is a vertical rear end view of the machine looking in a forward direction. In this figure the lower right-hand corner of the main frame structure thereof has been broken away.

Fig. 2 is a vertical view of the machine. The upper portion of this view is in fact a longitudinal sectional view taken as on the plane indicated by the line 2—2 of Fig. 1 looking in the direction of the arrows. In the lower portion of this Fig. 2 the exterior of the main frame is indicated but part of this frame section has been broken away in order to show how a motor which is supported within the lower portion of the framework can through the medium of a reducing speed gearing drive an endless receiving and delivering conveyor which extends outwardly from within the central portion of the main frame.

In Figs. 1 and 2 it is readily seen that the slicing machine comprehends a main frame upon which there is rotatably mounted a main drive shaft carrying and driving a rotatable cutting element or cutting member, the cutting edges of the cutting blades of which have a cone-like arrangement—which cutting edges in fact have the formation of a conical helix or a conical spiral depending upon how viewed and which is arranged with the small end of the conical helix rearmost.

The main frame is also shown as supporting a main motor over the cutter carrying shaft and this main motor is suitably connected to the cutter carrying shaft so that it can continuously drive and rotate the shaft and thereby the cutter.

Fig. 3 is a view partially in section showing the cutting element or cutter that is employed in the machine of Figs. 1 and 2. It will be noted that in this figure there is shown an outwardly and rearwardly extending flange portion at the front end of the cutter and a member providing an outwardly and rearwardly extending flange portion at the rear or small end of the cutter.

Fig. 4 is a vertical transverse sectional view of the cutter taken as on the plane indicated by the line 4—4 of Fig. 3 but it will be noted that the sectional view of this Fig. 4 shows the construction of Fig. 3 as it would appear if the flange providing member at the rear end of the cutter had been removed.

Fig. 5 is a horizontal sectional view taken as on the plane indicated by 5—5 of Fig. 4.

Figure 1:
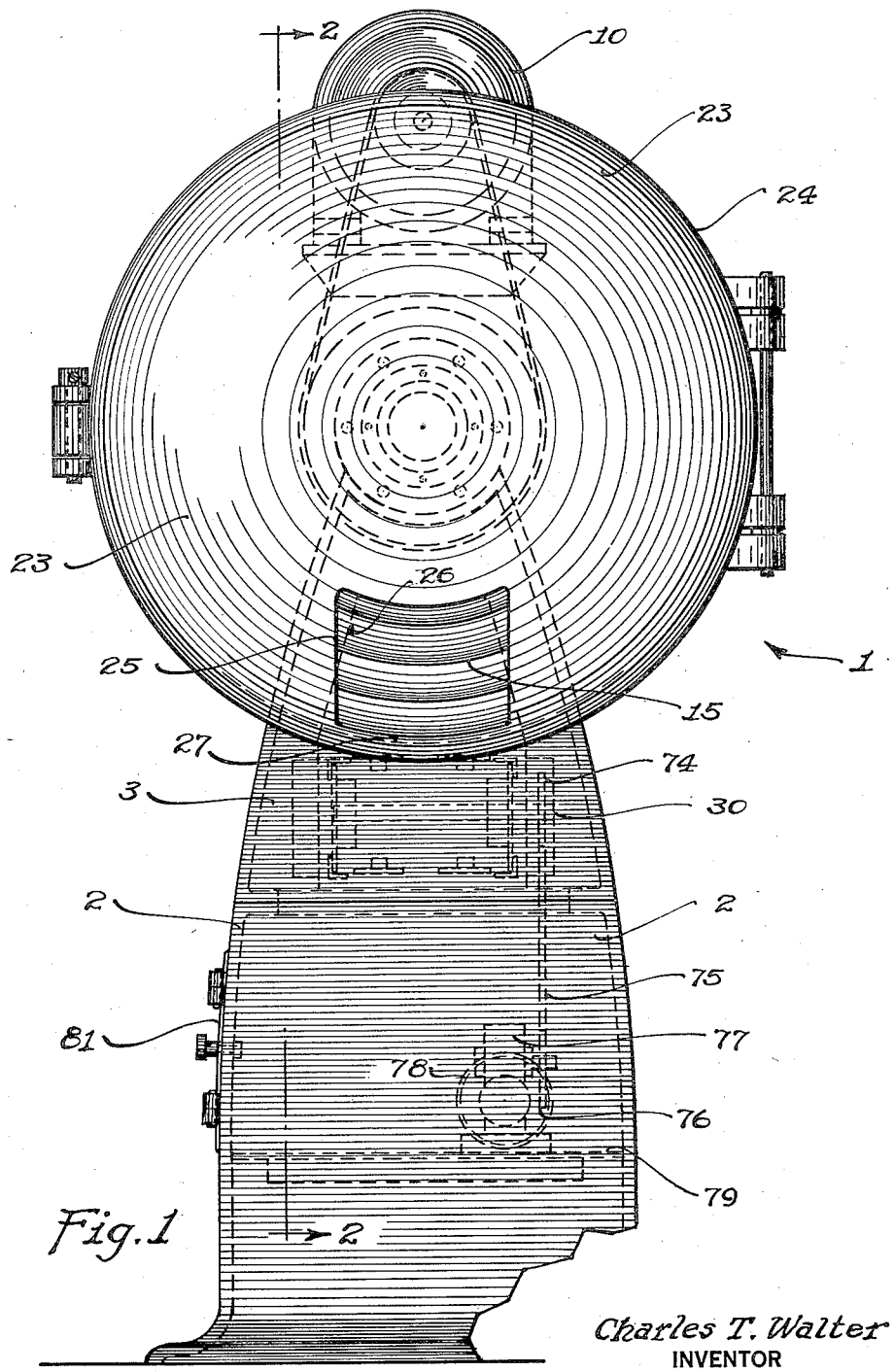

Reference will now be made to the drawings in detail. The main frame of the slicing machine to which the present invention is directed is collectively designated by 1. It comprehends a lower base section or lower frame member 2 and an upper section or upper frame member 3. The lower frame member and the upper frame member are suitably connected, as by bolts at 4, and it will also be noted that they are in direct communication with each other as through the openings at 2ª and 3ª. The upper frame member carries a forward extension or bearing sleeve member 5 suitably secured thereto and suitable bearings are provided at 6 in the upper frame member and at 7 in the forward extension whereby a longitudinally extending shaft 8 frequently referred to herein as the cutter carrying and driving shaft 8 is suitably mounted in a manner to permit continuous rotation of the shaft. The detail construction of the bearings has been omitted but it will be manifest that any suitable bearing construction can be employed preferably of the anti-friction type. The upper frame member 3 also carries a forwardly extending motor carrying bracket or shelf providing member 9 which is suitably secured thereto and a motor 10, sometimes herein referred to as the main motor 10, is adjustably secured to this bracket 9 as through the medium of adjusting screws and bolts indicated at 11. The rotor of the motor carries and drives a pulley or gear 12 which through the medium of a belt as chain belt 13 in turn drives the main pulley or gear 14 that is directly secured to the cutter carrying and driving shaft 8.

It will be readily seen that from this main motor the cutter carrying shaft 8 can be continuously rotated as the machine normally functions. At the rear end of the machine the cutting element or rotary cutter 15 is fixedly secured as through the medium of the splined shaft end 16 and the clamp or nut 17. The cutter 15 employed is clearly illustrated in Figs. 3 to 6, inclusive, and will later be described in detail. It is sufficient to note at this time that the cutter employed runs at a relatively high speed and because of the conical helical construction of the cutting blade thereof it simultaneously effects progressive cutting actions on spaced portions of the meat product being sliced, as for example upon a pork loin designated as 18; that the conical helix of the cutter progressively draws the meat products being sliced along a forward path under its continued influence; and that the cutter allows the cut sections to drop from the cutting zone 19 into a receiving space whereby the sliced material can become deposited in a receiving space designated as 20 whereat the sliced material can be delivered to or received upon an endless continuously moving conveyor as 21. The rear end of this endless conveyor 21 is located slightly forward in respect to the cutting zone and slightly below the cutting zone and if desired a plate or receiving pan member as 22 can be inserted so as to cover or fill any gap which may exist between the frame structure at or defining the lower portion of the cutting zone on the one hand and the top portion of the endless conveyor on the other.

The cutter is covered or partially protected by a portion of the main frame, to-wit, by that portion designated as 23 of the main frame and therewith there is associated or detachably secured in place in respect thereto a removable casing member 24. The parts 23 and 24 in effect completely encase or enclose the rotary cutting element whereby workmen about the machine are protected from accidental injury. However it is essential in machines of this type that proper ingress and egress openings be provided for the passage of material to be sliced into the machine and for the passage of material which has been sliced from the machine and to that end ingress and egress openings are provided at 25, 26 and 26ª. These ingress and egress openings are preferably arranged in sets. There can be employed one or more sets dependent upon the number of places on the machine whereat it is desired to carry out cutting operations. At the rear side of the machine there is provided an anvil-like or supporting portion 27 and also a supporting member as 28 which collectively constitute a supporting means upon and along which the meat products or pork loins are supported as they are fed longitudinally in a forward direction into the machine.

The portion 29 of the main frame also in effect serves as means for supporting a portion of the meat products while the slicing operation is being performed upon the meat products. Fig. 2 in conjunction with the aforegoing description clearly discloses how the sliced meat products can pass from the cutting zone to and upon the endless receiving and delivering conveyor and by the latter be carried from the machine. It will be also noted that in this outward travel the meat products pass through the egress openings provided at 26 and 26a.

The endless conveyor 21 has a horizontally extending shaft 30 that carries pulleys or equivalent members 31 and which functions when turned to effect movement of the endless conveyor. This turning movement is accomplished through the medium of a sprocket wheel 74, chain drive 75, sprocket wheel 76 and reducing speed gearing 77 which is driven from the small lower motor indicated at 78. This reducing gearing 77 and the motor 78 is supported in any suitable manner as upon plate 79 which is secured in place within the lower frame member 2 in any suitable manner as through the medium of the angle irons 80 which are secured in any suitable manner to the lower base member 2. This motor and associated chain drive construction for the endless conveyor are completely contained within the main frame structure and access thereto is through the medium of the hinged door indicated at 81. An inspection of Figs. 1 and 2 will make it clear that the entire construction is embodied in a neat compact arrangement requiring relatively small floor space and in which all of the operating parts are completely enclosed or can be readily enclosed. The qualifying langauge used has been employed because there has not been shown any protecting construction over the gears 12 and 14 and the chain 13 but protecting devices for this construction are well known in the industries and are generally employed and illustration thereof at this time is not deemed to be necessary.

The construction of the cutter or cutting element designated as 15 and which is supported on and carried by the shaft 8 is clearly shown in Figs. 3 to 6, inclusive.

In Figs. 3 to 6, inclusive, it will be seen that the cutter has a hub or central supporting member 32 provided with a keyway as 33 whereby the cutter can be detachably secured to the splined portion 16 of the shaft in a manner whereby the cutter means turn as the shaft turns about the longitudinally extending axis of the shaft or what is the same thing about the longitudinally extending axis of the cutter itself. This hub has a drum or body portion 34 and at the forward end thereof there is secured a resisting member or shoulder 35 providing a forward flange 36. In the construction shown this member 35 is detachably secured to the body or drum portion of the hub through the medium of bolts as 37. This forward flange 36 and particularly a rear face portion thereof inclines in an outward rearward direction. A spider member 38—clearly shown in Fig. 6—is carried on the drum or body and an inwardly extending flange portion 39 of this spider member enters a corresponding recess portion 40 of the drum or body portion whereby the spider through the medium of said inwardly extending flange portion 39 is clamped in place between the drum or body portion on the one hand and the resisting member or shoulder 35 on the other. This spider has a longitudinally extending cylindrical body portion 41 and several sets of longitudinally extending outwardly projecting members as 42 and 43 which provide between them longitudinally extending and radially extending grooves or grooved portions 44.

Figure 6:
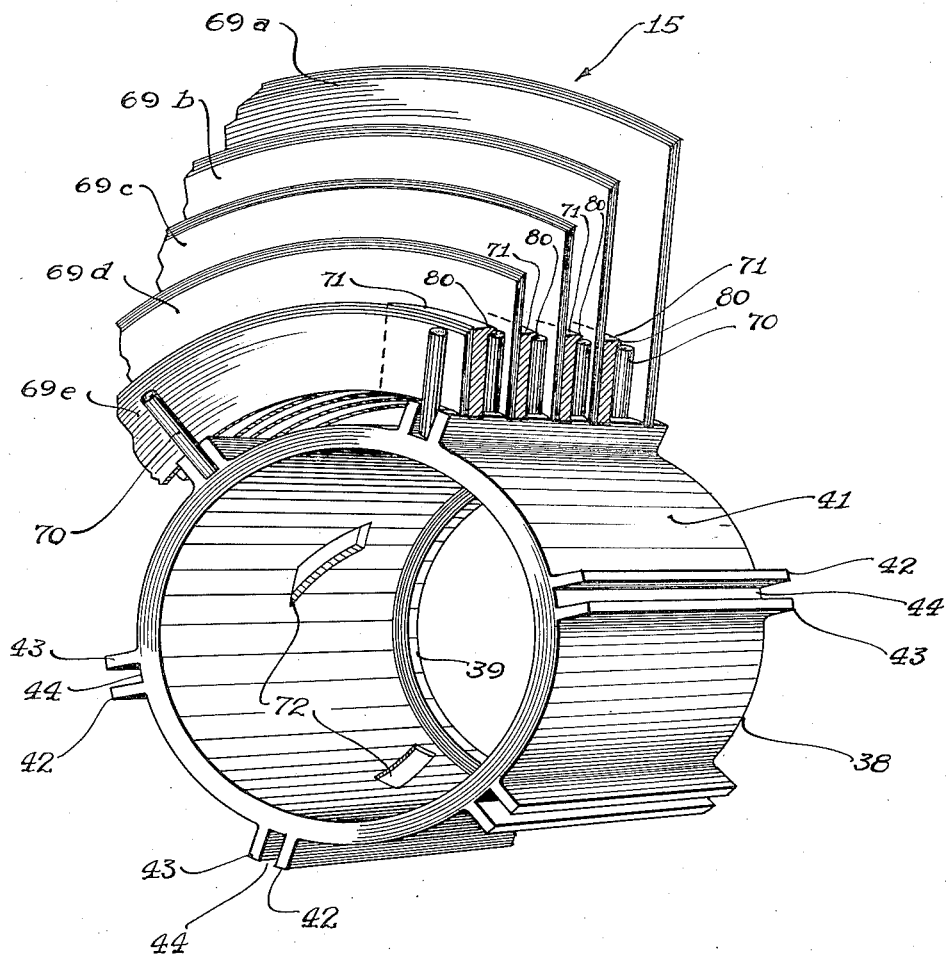
Fig. 6 is a perspective view showing the arrangement of some of the cutter element parts as employed in the cutter construction of Figs. 3 and 4.

In Fig. 6 it will be noted that there are six sets of these longitudinally and radially outwardly extending members 42 and 43 and these sets are equally spaced about the exterior of the cylindrical body portion 41 of the spider member. The function of this spider and the grooved portion 44 thereof will presently appear. An inspection of Fig. 3 will make it apparent that a substantially cylindrical rear sleeve member 45 is provided which has a forward portion 46 that enters the body portion 41 of the spider and the exterior of the drum or body portion 34 of the hub. Guide ribs 47 on the member 45 enter corresponding guideway grooves 48 on the hub member 34. This longitudinally extending guideway construction provided by the parts 47 and 48 prevents any rotative movement of the sleeve 45 in respect to the drum but it permits adjustable longitudinal movement of the sleeve 45 relative to the drum and relative to the spider 38. The parts of this rear sleeve member 45 serve to interiorly support the cylindrical body portion 41 of the spider from the drum or body portion of the hub. At the rear end of the drum or body portion of the hub there is detachably secured in place by means of screws 49 a rear holding ring 50. This rear holding ring is provided with a trunnion receiving opening 51. The drum or body portion 34 of the hub is cut away at 52 and is provided with a trunnion receiving opening 53. In the space 52 there is rotatably mounted a relatively long pinion gear 54 having trunnions 55 and 56 that enter the trunnion receiving openings 51 and 53 previously referred to.

Trunnion 55 is provided with a non-circular wrench receiving opening 57 whereby when a suitable wrench is inserted therein the gear 54 can be turned at will. The drum or body portion 34 has an outer intermediate section thereof which is provided with screw threads at 58 and upon which a circular adjusting sleeve 59 which is interiorly threaded at 60 is mounted in such a manner that the screw threaded portion at 60 operatively engages the screw threaded portion at 58. This adjusting sleeve is provided with an internal gear 61 the teeth of which mesh with the teeth of the pinion gear 54. It will be manifest that a turning of the pinion gear 54 by means of the wrench construction heretofore described can be relied upon to effect an inner or outer movement of the adjusting sleeve relative to the drum or body portion 34 upon which the adjusting sleeve is mounted. The outer rear end portion of the adjusting sleeve is screw threaded at 62 and an annular nut 63 is mounted thereupon. The rear sleeve member 45 previously referred to has an inwardly extending flange portion 64 which enters a grooved space provided in the adjusting sleeve member 59. The construction of the inwardly extending flange member 64 of the grooved portion of the adjusting sleeve and the annular nut 63 when in place on the adjusted sleeve is such that the adjusting sleeve can turn relative to the rear sleeve member and such that as the result of this turning movement the rear sleeve member 45 can be moved in a forward or rearward direction according to the will of the operator.

The rear sleeve member is exteriorly threaded at 65 and an annular rear member 66 is mounted thereupon. An annular nut 67 is provided so that by means of this nut the member 66 can be secured and held in place in respect to the rear sleeve member 45.

This annular rear member 66 may be considered as a member providing a rear flange because it comprehends and provides the rear flange 68 and it will be observed that this rear flange 68 and particularly the front face portion thereof is inclined outwardly and rearwardly. In fact, it is inclined in such a manner that the forward face of this rear flange practically parallels the rear face of the forward flange. Between these faces or in other words between the front and rear flange portions 36 and 68 the structure that provides the cutting element structure can be fixedly and firmly secured or clamped in place. The cutting element structure just mentioned may be considered as composed of or comprising the several cutting blade sections designated as 69ª, 69ᵇ, 69ᶜ, 69ᵈ and 69ᵉ. It also comprises pins designated as 70 and wedges designated as 71. The pins 70 are arranged and positioned so that the innermost ends thereof extend into the grooved portions 44. The extending of the pins into the grooved portions 44 provides means whereby any tendency of the cutting structure to rotate relative to the hub is readily avoided. These pins when in place extend upwardly and outwardly. Some of them engage the rear face of the front flange, some of them engage cutting blades, while others of them engage with wedges or the rear face of the front flange.

These pins also engage wedge members as is particularly clear from figures such as 5 and 6. It has heretofore been pointed out how the rear flange 68 can be moved towards or from the front flange 36. It will also be apparent particularly from figures such as 5 and 6 that an angular positioning of the blades relative to the pins or in other words an angular positioning of the wedges 71 relative to the pins can be employed to effect a longitudinal adjustment of one blade convolution relative to the blade convolution adjacent thereto, in other words to effect or regulate the cutting pitch $p$ of the cutting blades. This pin and wedge construction can also be employed to in effect regulate or determine the shortest distance $s$ between the adjacent faces of adjacent blade convolutions. When in place between the flanges 36 and 68 it will be observed that the wedges and the blades provide a direct train whereby compressive or gripping forces can be applied from one flange to the other in a manner to securely hold and clamp the blade structure as a whole in operative position relative to the hub. It will also be apparent as previously indicated that this wedge and pin construction provides adjusting means which can be relied upon to determine the pitch or spacing of the blade elements in reference to each other.

It will be noted that wedges 71 are provided with shoulders 80 which prevent pins 70 from being thrown from their proper location by centrifugal force.

In construction of the cutter, it is practical and in many respects preferable to form the cutting blade or build it up by assembling cutting convolutions each of which subtends approximately 360 degrees. If built in this way it is practical to fabricate and form the cutting blade structure from flat sheet material which can be readily shaped and bent to the required form and configuration.

Reverting now to the spider construction of Fig. 6 and to the general arrangement of the cutter as shown in Fig. 3 it will be noted that keyway receiving openings 72 may be provided at the interior of the cylindrical body portion 41 of the spider member 38. Therein keys as 73 may be secured or carried so as to have sliding engagement with exterior groove portions of the cylindrical rear sleeve member 45. The sleeve member 45 is preferably provided with helically extending key receiving portions 74 that serve to provide key receiving guideways which can be relied upon to permit the longitudinal forward or rearward movement of the sleeve member 45 and at the same time provide angular movement of the spider member 38 relative to the sleeve member 45. It has previously been pointed out how angular movement of the sleeve member 45 relative to the hub or central supporting section of the cutter is prevented because of the longitudinally extending guideways or guideway means at 47 and 48 and thus there is provided in the cutter construction means which positively provide angular movement of the spider member 38 relative to the hub construction of the cutter.

It is the axial movement of helical key 73, which is firmly attached to spider shell 41, which slides in helical guideway 74 in member 45 that causes the angular displacement of spider member 38 and consequently of pins 70. Further, it is the angular motion of pins 70 with respect to the stationary wedges 71 and blades 69 which changes the distance between adjacent blades.

It will be noted that the total displacement between the inward faces of members 36 and 68 is equal to the sum of the displacement between the several blades. This condition is brought about by the proper choice of the pitch angle of wedges 71 and the pitch of spiral keyway 74.

I claim:

1. In a rotatable slicing element, a hub, a supporting core on the hub which supporting core has slotted portions that extend longitudinally and radially, a front flange carried by the hub and secured thereto, a rear flange, means carried by the hub for forcing the rear flange forwardly towards the rear hub in order to effect a clamping and holding of cutter sections between the flanges and for holding the rear flange in said forward clamping position, a cutting blade in the form of a conical helix, which cutting blade is composed of assembled convolute cutting sections subtending approximately 360 degrees and of relatively uniform thickness in the body section thereof, radially extending pins some of which engage the inner face of the flange portion and others of which engage the cutting blade but which pins extend into the slotted portion of the supporting core, and wedge members which engage said pins, some of which wedge members engage flange portions that are spaced from said pins by said wedge members and others of which wedge members engage sections of convolutions that are spaced from said pins by said wedge members which pins and wedge shaped members determine the pitch of the cutting sections when clamped in place between the front and rear flanges.

2. In a rotatable slicing element, a hub having a circumferential front flange all inner or rear face portions of which extend outwardly and rearwardly, blade elements which when in position extend outwardly and rearwardly and define a peripheral cutting edge which is in the form of a conical helix, adjustable filling means comprising members assembled in place between the rear face of the front flange and the foremost convolution of the blade element, between adjacent convolutions and between the front face of the rearmost convolution and the front face of a rear flange, and holding means positionable in respect to said hub which said holding means provides the aforementioned rear flange, said rear flange being a circumferential flange all inner or front face portions of which extend outwardly and rearwardly, the rotatable slicing element having means whereby said holding means can be positioned to effect a clamping of the blade elements in between said front and rear flanges and the proper holding of said blade elements on said hub and against angular movement relative to said hub.

3. A meat cutting machine having in combination a main frame, a longitudinally extending cutter carrying shaft arranged at the upper portion of the machine, a motor supported on the frame above said cutter carrying shaft, means whereby said motor can continuously rotate said cutter carrying shaft, a revolvable cutting element detachably secured to said shaft and rotatably driven thereby, said cutting element comprising a cutting blade or knife providing a cutting edge in the shape of a conical helix with the small end of the helix rearmost, a casing covering said cutter for protecting workmen against injury by the cutter during its normal operation, said casing being provided with ingress and egress openings whereby meat to be cut can be fed along a longitudinal forward path to cutting position in respect to the cutting element, means radially spaced from and in respect to the axis of the cutter carrying shaft for providing means along which material to be cut is fed into the machine, a continuous conveyor having a transversely extending shaft supported in the frame of the machine and carrying rotary driving members that support and drive one end of the endless conveyor, which is positioned so that the upper strand of the endless conveyor serves to receive slices delivered to it as the result of the cutting operation and to feed the slices thus delivered to it in a longitudinal direction from the machine, a second motor carried by the frame of the machine at the lower part thereof below the path of material passing through said ingress and egress openings, and means between said motor and said transversely extending shaft for driving the latter from said motor but at a reduced speed.

4. A meat slicing machine comprising in combination and operative arrangement a main frame, a longitudinally extending cutter carrying shaft revolvably supported at the upper portion of the main frame, a motor supported on the main frame above said cutter carrying shaft, means by which said motor can continuously rotate said cutter carrying shaft, a revolvable cutting element rotatably driven by said shaft, said cutting element comprising a cutting blade or knife providing a cutting edge of spiral type formation, a casing covering said cutter for protecting workmen against injury by the cutter during its normal operation, said casing being provided with ingress and egress openings whereby meat to be cut can be fed along a forward path to cutting position in respect to the cutting element, means radially spaced from and in respect to the axis of the cutter carrying shaft for providing means along which material to be cut is fed into the machine, a continuous conveyor having a transversely extending shaft supported in the frame of the machine, which shaft carries rotary driving members that support and drive one end of an endless conveyor, the endless conveyor being arranged so that the upper strand thereof receives slices delivered to it as the result of the cutting operation, a second motor carried by and within the lower portion of the frame of the machine, and means between said motor and said transversely extending shaft of the endless conveyor for driving said shaft from said motor at a reduced speed.

5. A rotary cutter for use in meat cutting machines which said cutter includes in combination a hub which when in place revolves about a longitudinally extending axis, a front flange secured to the front portion of said hub, the outer rear face portion of which front flange extends outwardly and rearwardly, a spider section which provides grooved portions for receiving the inner ends of outwardly extending pins, which grooved portions extend longitudinally and radially, a rear flange member mounted on said hub so that it can be longitudinally positioned towards the front flange, the outer forward face portion of which rear flange extends outwardly and rearwardly in a manner to substantially parallel the outwardly and rearwardly extending rear face of the front flange, means for positively forcing the rear flange longitudinally towards the front flange for effecting holding of cutting blade sections when in place, conical helical cutting blade sections assembled in place on the spider and between the front and rear flanges, outwardly and rearwardly extending pin members the inner ends of which extend into the longitudinally and radially extending grooved portions of the spider on the one hand and outwardly into the space provided between the flange portions in a manner whereby the outer ends of the pins overlap the innermost portions of the cutting blades, and wedge shape members in association with said pins and portions of the cutting blade elements whereby dependent upon the positions of the wedges the longitudinal pitch between the cutting edges of the blade section can be regulated as desired, the construction being such that when the rear flange member is positively forced in a longitudinal direction towards the front flange member it can be relied upon to firmly secure and hold in the adjusted position the cutting elements in respect to each other and also in respect to the other members constituting the cutting element.

6. A rotatable slicing element comprising a supporting means including a hub, a cutting blade in the form of a conical helix removably clamped on said supporting means, and coacting wedge members and pins interposed between sections of said cutting blade to adjust the pitch of such cutting sections when the blade is clamped on the supporting means.

7. A rotatable slicing element comprising a supporting means including a hub, a cutting blade in the form of a conical helix removably clamped on said supporting means, and cooperating wedge members and radially disposed pins arranged between sections of said cutting blade whereby to adjust the pitch of such cutting sections when the blade is clamped on said supporting means.

8. A rotatable slicing element comprising a supporting means including a cylindrical member having spaced aligning grooves, a cutting blade in the form of a conical helix secured on said cylindrical member, wedge members arranged between cutting sections of said blade, and pins disposed at their inner ends in said grooves of the cylindrical member and projecting outwardly radially and coacting with the respective wedge members whereby to adjust the pitch of the cutting sections.

9. A cutting element comprising a rotatable supporting means, a cutting blade in the form of a conical helix mounted on said rotatable supporting means, means for adjustably holding the blade in operative position on the rotatable supporting means, and means disposed between the cutting sections of the blade and operable separately from and independently of the aforesaid adjustable holding means to adjust the pitch of the cutting sections of the blade.

10. A rotatable cutting element comprising a supporting means including a cylindrical member having pairs of equidistant, spaced, longitudinally disposed members forming grooves, a blade in the form of a conical helix, means for securing the blade on the cylindrical member against displacement with relation thereto, wedge members bridging said spaced members and disposed thereon and engaging side faces of respective cutting sections of the blade, and elements located in the respective grooves of the cylindrical member and coacting with the wedges to adjust the pitch of the cutting sections.

11. A rotary cutting element comprising a supporting means including a cylindrical member having pairs of outwardly disposed parallel substantially longitudinally extending projecting spaced members forming grooves between them, a blade in the form of a conical helix having its inner edge disposed on said pairs of members transversely thereof, means for securing the blade against displacement, and means for adjusting the pitch of the cutting sections of the blade.

12. A rotary cutting element comprising a supporting means including a cylindrical member having pairs of outwardly disposed parallel spaced members forming grooves between them, a blade in the form of a conical helix having its inner edge disposed on said pairs of members transversely thereof, means for securing the blade against displacement, wedge members disposed on said pairs of parallel members adjacent side faces of the respective sections of the cutting blade, and elements disposed in and projecting from the respective grooves and coacting with the respective wedge members whereby to adjust the pitch of the cutting sections of the blade.

13. A rotary cutting element comprising a supporting member having outwardly projecting members, a blade in the form of a conical helix having its inner edge disposed on and extending across said projecting members and its cutting edge remote therefrom, and means cooperating with the projecting members and the cutting sections of the blade to adjust the pitch of the cutting sections of the blade with relation to one another.

14. A rotary cutting element comprising a supporting member having outwardly projecting members thereon, a plate in the form of a conical helix having its inner edge disposed on said projecting members and its cutting edge remote therefrom, means for adjustably clamping the conical helix on said projecting members and means including wedge members cooperating with the projecting members and with the cutting sections of the blade to adjust the pitch of the cutting sections of the blade.

15. A rotary cutting element comprising a supporting member having outwardly projecting members, a blade in the form of a conical helix having its inner edge disposed on and substantially transversely of said projecting members and its cutting edge spaced therefrom, means for adjustably clamping the conical helix in operative position on said supporting member and with respect to said projecting members and means including radially disposed spaced pins cooperating with the projecting members and the cutting sections of the blade to determine the pitch of the cutting sections of the blade.

16. A rotary cutting element comprising a supporting member having spaced sets of projecting members, a blade in the form of a conical helix having its inner edge disposed on said sets of projecting members and its cutting edge spaced therefrom, and means including wedge members and pins coacting together and with the projecting members and the cutting sections of the blade to adjust the pitch of the cutting sections.

17. In a meat cutting machine, a hollow frame having aligning ingress and egress openings therein, a shaft journaled in the frame, means for driving the shaft, a cutting element mounted on and driven by the shaft, a casing enclosing the cutting element and having an opening therein in advance of the ingress opening, a meat supporting means arranged with relation to said opening in the casing for the progressive feeding of meat into said opening and through the ingress opening of the frame and through the egress opening of the frame and adapted to be cut by said cutting element within said casing, a discharge conveyor having its inner end extending into the hollow frame and spaced from said meat supporting means, means for driving said conveyor, and means bridging the space between the ingress opening of the frame and the inner end of the conveyor whereby the cut pieces of meat may be progressed by the cutting element from the cutting position over said bridging means and through the frame and out of the latter on said conveyor.

18. A rotatable slicing element comprising a supporting means including a hub, a cutting blade in the form of a conical helix removably mounted on said supporting means, means for clamping the cutting element on the supporting means including radially extending removable pins which engage side faces of the sections of the cutting blade, and wedge members which engage said pins and sections of the cutting blade.

19. A rotatable slicing element comprising a supporting means including a hub, a cutting blade in the form of a conical helix mounted on said supporting means, and means for securing the cutting blade removably on said supporting means against accidental disconnection therefrom including elements spaced apart in the direction of the curvature of the conical helix and arranged tightly between sections of the cutting blade.

20. A rotatable cutter of the characted described comprising a hub, a spider embracing the hub in spaced relation thereto, a sleeve having slidable interlocking connection with the spider and interposed partly between the hub and the spider, means whereby to adjust the hub and sleeve relative to each other, a front flange carried by the hub and extending outwardly beyond the spider at the front end of the latter, a rear flange adjustably mounted on said sleeve for adjustment toward and away from said front flange, a cutting blade in the form of a conical helix carried by the spider, and means for adjusting the pitch of the blade sections.

21. A rotable cutter of the character described comprising a hub, a spider embracing the hub in spaced relation thereto, a sleeve having slidable interlocking connection with the spider and interposed partly between the hub and the spider means whereby to adjust the hub and sleeve relative to each other, a front flange carried by the hub and extending outwardly beyond the spider at the front end of the latter, a rear flange adjustably mounted on said sleeve for adjustment toward and away from said front flange, a cutting blade in the form of a conical helix carried by the spider, and cooperating pins and wedge elements arranged between the sections of the blade and between the front and rear sections of the blade and the said front and rear flanges to secure the blade on the spider.

22. A rotatable slicing element comprising a supporting means, a cutting blade in the form of a conical helix removably mounted on said supporting means, and cooperating wedge members and radially disposed pins disposed between the sections of said cutting blade whereby to adjust the pitch of such cutting sections, the wedges and the respective pins being constructed and arranged with relation to each other so as to prevent accidental displacement of the pins incident to centrifugal force due to rotation of the supporting means.

23. A cutting element comprising a rotatable supporting means, a cutting blade in the form of a conical helix mounted on said rotatable supporting means, means for adjustably holding the blade in operative position on the rotatable supporting means, and separate sets of elements disposed between the cutting sections of the blade and operable independently of the adjustable holding means to adjust the pitch of the cutting sections of the blade, the blade holding means and the blade and the blade pitch adjusting means being maintained at all times in abutting relation.

24. A rotatable cutter of the character described comprising a hub, a spider embracing the hub in spaced relation thereto, a sleeve having slidable interlocking connection with the spider, a gear connection between the hub and the sleeve whereby to adjust the same relative to each other, a front flange carried by the hub and extending outwardly beyond the spider, a rear flange adjustably mounted on said sleeve for adjustment toward and away from said front flange, and a cutting blade in the form of a conical helix arranged between said flanges.

25. A rotatable cutter of the character described comprising a hub, a spider embracing the hub, a sleeve having slidable connection with the spider, means to adjust the hub and sleeve relative to each other, a blade supporting member embracing the spider and said sleeve, a cutting blade in the form of a conical helix carried by the supporting member, and means for adjustably maintaining the conical helix on said supporting member.

26. A rotatable cutter of the character described comprising a hub, a spider embracing the hub, a sleeve having slidable connection with the spider, means to adjust the hub and sleeve relative to each other, a blade supporting member embracing the spider and said sleeve, a cutting blade in the form of a conical helix carried by the supporting member, means for adjustably maintaining the conical helix on said supporting member, and an independent adjustable means arranged between the cutting sections of the blade to adjust the pitch of the cutting sections of the blade.

27. In a device of the class described, in combination, a main frame, a longitudinally extending shaft, a conical helical cutter on said shaft having its larger end adjacent said frame, means for rotating said shaft, and a protective casing over the cutting element comprising a flat conical shaped portion concentric with the cutter shaft and having an opening therefor, said portion being connected with the main frame and covering the larger end of the conical helical cutter, and a removable dome shaped portion closely spaced from the conical helical cutter edge, said portions being brought into engagement at their peripheral edges and provided with oppositely disposed, vertical openings for the passage of material as it progresses under the influence of the cutting element.

28. In a device of the class described, in combination, a main frame, a longitudinally extending shaft, a conical helical cutter on said shaft having its larger end adjacent said frame, means for rotating said shaft, supporting means radially and axially spaced with respect to said shaft for supporting material to be sliced, and a protective casing over the cutting element comprising a flat conical shaped portion constituting a part of the main frame, said portion being concentric with the cutter shaft and having an opening therefor, a removable dome shaped portion closely spaced from the conical helical cutter edge, said portions being brought into engagement at their peripheral edges and provided with oppositely disposed vertical openings for the passage of material as it progresses under the influence of the cutting element, and an anvil within said casing between said openings and aligned with said supporting means.

CHARLES T. WALTER.